United States Patent
Mueller

(10) Patent No.: US 7,578,451 B2
(45) Date of Patent: Aug. 25, 2009

(54) APPARATUS FOR THERMAL SPRAYING

(75) Inventor: Markus Mueller, Dintikon (CH)

(73) Assignee: Sulzer Metco AG, Wohlen (CH)

( * ) Notice: Subject to any disclaimer, the term of this patent is extended or adjusted under 35 U.S.C. 154(b) by 297 days.

(21) Appl. No.: 11/330,924

(22) Filed: Jan. 11, 2006

(65) Prior Publication Data

US 2006/0180080 A1    Aug. 17, 2006

(30) Foreign Application Priority Data

Feb. 11, 2005   (EP)   ................................. 05405185

(51) Int. Cl.
B05B 15/00 (2006.01)
(52) U.S. Cl. .................. 239/132.3; 239/69; 239/79; 239/85; 239/128; 239/132; 239/135; 239/290; 239/600; 219/76.16; 219/121.47; 219/121.49
(58) Field of Classification Search .............. 239/79, 239/13, 548, 549, 80–85, 34, 51.5, 60, 69, 239/128, 132, 132.3, 135, 290, 600; 285/396, 285/402, 361, 82, 84, 87, 88, 124.1–124.4; 219/76.14, 76.16, 121.47, 121.49, 121.51
See application file for complete search history.

(56) References Cited

U.S. PATENT DOCUMENTS

| | | | | |
|---|---|---|---|---|
| 1,930,373 A | * | 10/1933 | Stubenrauch | 239/84 |
| 1,968,992 A | * | 8/1934 | Conkling | 222/146.5 |
| 2,207,765 A | * | 7/1940 | Stevens | 239/83 |
| 2,417,981 A | * | 3/1947 | Graham | 431/91 |
| 2,643,955 A | * | 6/1953 | Powers et al. | 427/447 |
| 2,719,245 A | * | 9/1955 | Anderson | 314/69 |
| 2,749,176 A | * | 6/1956 | Steyer | 239/80 |
| 2,943,673 A | * | 7/1960 | Hickman | 431/1 |
| 2,960,275 A | * | 11/1960 | Wolf | 239/85 |
| 3,034,568 A | * | 5/1962 | Fowler et al. | 431/91 |
| 3,064,114 A | * | 11/1962 | Burden et al. | 219/74 |
| 3,106,238 A | * | 10/1963 | Bruce | 431/1 |
| 3,141,616 A | * | 7/1964 | Cauchetier | 239/81 |
| 3,145,287 A | * | 8/1964 | Rotolico et al. | 219/75 |
| 3,148,818 A | * | 9/1964 | Charlop | 226/176 |
| 3,159,348 A | * | 12/1964 | Wedan | 239/85 |
| 3,171,599 A | * | 3/1965 | Rotolico | 239/85 |
| 3,312,566 A | * | 4/1967 | Tucker et al. | 427/449 |
| 3,313,908 A | * | 4/1967 | Unger et al. | 219/76.16 |
| 3,342,626 A | * | 9/1967 | Batchelor et al. | 427/449 |
| 3,352,492 A | * | 11/1967 | Cape | 239/85 |
| 3,438,579 A | * | 4/1969 | Wiese | 239/85 |
| 3,514,036 A | * | 5/1970 | Smith, Sr. et al. | 239/85 |

(Continued)

FOREIGN PATENT DOCUMENTS

DE    8519228 U1    8/1985

Primary Examiner—Steven J Ganey
(74) Attorney, Agent, or Firm—Townsend and Townsend and Crew LLP

(57) ABSTRACT

The invention relates to an apparatus for thermal spraying (1) including a spray gun (2) with a burner (3), wherein an operating media (5) can be supplied to the spray gun (2) via a feed line (4), and a base part (6) which is in communication with a supply unit (8) for the operating medium (5) via a supply line (7). A releasable coupling device (9) is provided, with the feed line (4) including an adapter part (10) such that the adapter part (10) can be connected to the base part (6) by means of the releasable coupling device (9).

9 Claims, 5 Drawing Sheets

U.S. PATENT DOCUMENTS

| | | | | |
|---|---|---|---|---|
| 3,536,885 A | * | 10/1970 | Peter | 219/121.11 |
| 3,676,638 A | * | 7/1972 | Stand | 219/121.47 |
| 3,844,449 A | * | 10/1974 | Alter | 222/175 |
| 3,872,769 A | * | 3/1975 | Rosling | 89/1.11 |
| 3,901,441 A | * | 8/1975 | Kasagi | 239/81 |
| 4,094,567 A | * | 6/1978 | Karcher et al. | 439/194 |
| 4,095,081 A | * | 6/1978 | Ashman | 219/76.16 |
| 4,107,508 A | * | 8/1978 | Izumi et al. | 219/137.7 |
| 4,325,512 A | * | 4/1982 | Kenshol | 239/84 |
| 4,613,259 A | * | 9/1986 | Packer et al. | 406/14 |
| 4,634,611 A | * | 1/1987 | Browning | 427/449 |
| 4,668,852 A | * | 5/1987 | Fox et al. | 219/76.14 |
| 4,674,683 A | * | 6/1987 | Fabel | 239/13 |
| 4,688,722 A | * | 8/1987 | Dellassio et al. | 239/81 |
| 4,694,990 A | * | 9/1987 | Karlsson et al. | 239/81 |
| 4,720,044 A | * | 1/1988 | Stemwedel, Jr. | 239/84 |
| 4,794,937 A | * | 1/1989 | Hofmann | 137/614.05 |
| 4,836,448 A | * | 6/1989 | Spaulding et al. | 239/79 |
| 4,853,513 A | * | 8/1989 | Fuimefreddo | 219/76.14 |
| 4,865,252 A | * | 9/1989 | Rotolico et al. | 239/8 |
| 4,928,879 A | * | 5/1990 | Rotolico | 239/8 |
| 5,013,883 A | * | 5/1991 | Fuimefreddo et al. | 219/121.47 |
| 5,316,347 A | * | 5/1994 | Arosio | 285/26 |
| 5,449,118 A | * | 9/1995 | Baker | 239/84 |
| 5,544,811 A | * | 8/1996 | Tillery et al. | 239/13 |
| 5,556,138 A | * | 9/1996 | Nakajima et al. | 285/124.4 |
| 5,935,458 A | * | 8/1999 | Trapani et al. | 219/121.47 |
| 5,964,405 A | * | 10/1999 | Benary et al. | 239/84 |
| 6,003,788 A | * | 12/1999 | Sedov | 239/397.5 |
| 6,042,019 A | * | 3/2000 | Rusch | 239/85 |
| 6,076,742 A | * | 6/2000 | Benary | 239/84 |
| 6,168,090 B1 | * | 1/2001 | Baker | 239/84 |
| 6,298,876 B1 | * | 10/2001 | Bogdonoff et al. | 137/614.06 |
| 6,354,521 B1 | | 3/2002 | Kusilek et al. | |
| 6,431,464 B2 | * | 8/2002 | Seitz | 239/80 |
| 6,443,498 B1 | * | 9/2002 | Liao | 285/124.1 |
| 6,572,029 B1 | | 6/2003 | Holt | |
| 6,598,279 B1 | * | 7/2003 | Morgan | 29/402.08 |
| 6,663,013 B1 | * | 12/2003 | Vanden Heuvel et al. | 239/83 |
| 6,845,929 B2 | * | 1/2005 | Dolatabadi et al. | 239/589 |
| 6,966,768 B2 | * | 11/2005 | Holler | 431/91 |
| 6,972,138 B2 | * | 12/2005 | Heinrich et al. | 427/446 |
| 7,055,864 B2 | * | 6/2006 | Pelfrey et al. | 285/124.5 |
| 7,216,814 B2 | * | 5/2007 | Gardega | 239/85 |
| 7,258,369 B2 | * | 8/2007 | Martin | 285/124.5 |
| 7,316,424 B2 | * | 1/2008 | Kardeis et al. | 285/91 |
| 2003/0209610 A1 | * | 11/2003 | Miller et al. | 239/132.3 |
| 2003/0233979 A1 | | 12/2003 | Tefft et al. | |
| 2004/0124256 A1 | * | 7/2004 | Itsukaichi et al. | 239/79 |
| 2004/0124631 A1 | * | 7/2004 | Kardeis et al. | 285/124.1 |
| 2005/0082395 A1 | * | 4/2005 | Gardega | 239/548 |
| 2005/0199739 A1 | * | 9/2005 | Kuroda et al. | 239/13 |

* cited by examiner

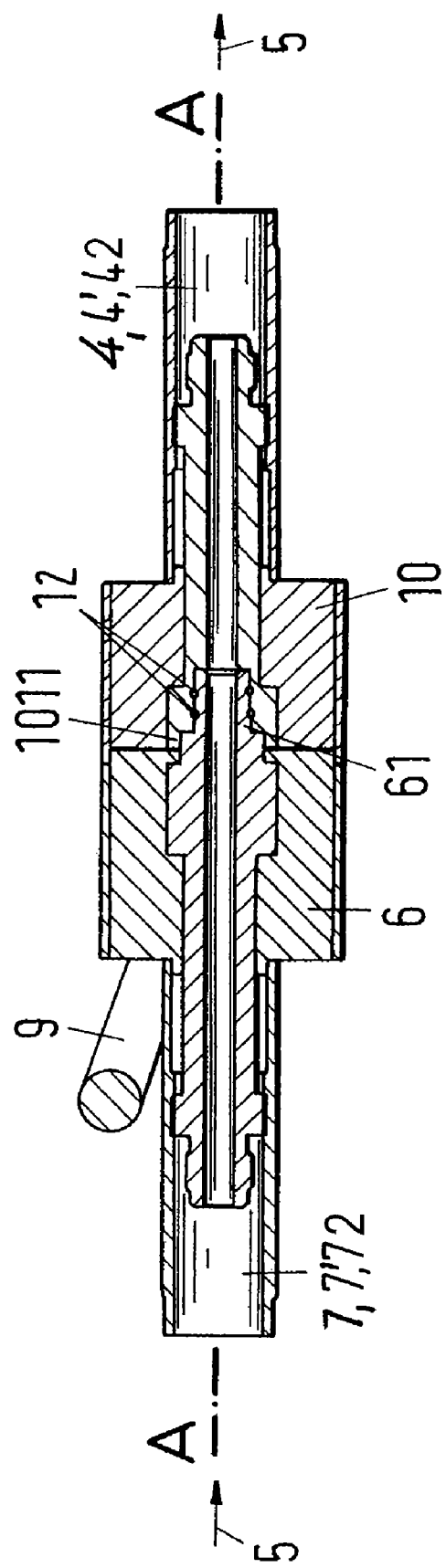

APPARATUS FOR THERMAL SPRAYING

BACKGROUND OF THE INVENTION

The invention relates to an apparatus for thermal spraying.

Thermal spraying plays an integral role both in the coating of individual parts and in industrial mass production. Increasingly, coating plants are being used, in particular when surfaces of complex shape have to be coated in large volumes, in which program-controlled robots fully automatically guide a spray gun according to a predetermined movement program and thus take over the coating of the surfaces of the most varied components. As a rule, such plants have a supply unit which makes available the electrical energy, operating gases such as oxygen, nitrogen, inert gases or other gases, as well as cooling water and many other operating media required for the operation of the spray gun. The spray gun is then connected to the supply unit via a supply line, with the supply line then including, in dependence on the demand, corresponding electrical lines, cooling lines, gas delivery pipes, etc.

In special cases, sensors are additionally provided in or at the spray gun, or at the robot unit for example, to monitor the spraying procedure, or control element; or regulating elements such as temperature sensors, flowmeters, stepper motors or hydraulic or pneumatic control units and/or regulating units are provided which likewise have to be connected either to the supply unit or to further control units via corresponding supply lines.

The spray apparatuses previously explained schematically can be equipped with very different types of spray guns depending on which spray method should be used. For instance, different types of plasma burners can be provided, e.g. the Sulzer Metco plasma burner of the Triplex II type, an F4-MB plasma spray gun, a plasma spray gun of the 9 MB or 3 MB type or an "internal" plasma spray gun of the SM-F300 or SM-F100 Connex type which is particularly suited for the coating of internal surfaces such as cylinder bores, or also burners of other manufacturers such as the F6 burner of GTV.

However, not only plasma spray guns are used. The previously described apparatuses for thermal spraying can also be equipped, among other things, with spray guns for flame spraying with wires or powder, guns for flame shock spraying or high velocity flame spraying (HVOF) or with spray guns for arc spraying. This list of the possible types of spray guns is by no means exclusive. All possible types of spray guns can rather advantageously be used in such plants.

The specific selection of the spray method depends on different factors. Among other things, it depends on the type of the base material of the workpiece that should be coated. It also depends on the type of the material to be sprayed on or on the required functions for the coating to be sprayed (e.g. corrosion-resistant coating, heat-insulating coating, decorative coating, coating against mechanical wear, coatings with good tribological properties, protective coating against chemical influences, etc.). One or the other spray processes will provide special advantages in dependence thereon.

It is also not uncommon, for instance, for a workpiece to have to be provided, for example, with a plurality of coatings of different types lying above one another or next to one another which have to consist, for example, of different materials and/or have to be sprayed according to different processes, since the surfaces sprayed according to different processes can even have different properties when identical spray materials are used.

The different spray processes and the spray guns used therefor have long been very well known in the prior art and therefore do not need to be discussed more closely in detail at this point. A very exhaustive overview of spray processes and corresponding spraying apparatuses or spray guns is given, for example, in K. Smolka "Thermisches Spritzen, Ein Leiffaden für den Praktiker" [Thermal Spraying, A Guideline for the Practical User], Deutscher Verlag für Schweisstechnik, 1985.

Although, as already mentioned, the described apparatuses for thermal spraying with components such as robots for the guiding of the spray guns, supply devices for the supply of the spray guns with operating media (within the framework of this application, the term operating media should be understood to include everything which is required for the proper operation of a spray gun, that is, in addition to operating gases, spray powders or spray wires, also coolants, such as cooling water, or electrical energy or whatever operating media is required for the operation of the spray gun) or control units and regulating units have been well-known for a long time and are also solidly established in series and mass production, the change of the spray gun or of the burner of the spray gun has previously been very complex since, on the change of the spray gun or of the burner, the supply line, which frequently consists of a plurality of components such as an electrical feed line, a cooling water feed line, a supply line for operating gases, etc., has to be dismantled in a time-consuming manner.

In particular the burner hoses, e.g. with plasma burners, which, as a rule, are designed as internally cooled electrical supply lines, create problems here. On the one hand, the high electrical operating currents (typically approx. 500 A-700 A at 40 V-60 V operating voltage) have to be transported safely, that is, in particular free of flash-over and with good insulation, to the plasma burner and, on the other hand, the live internally cooled lines have to be sealed sufficiently against the cooling water standing under relatively high pressure (the water pressure in the line can easily amount to 16 bar and more). In addition, operating gases, in particular also inert gases, very frequently have to be supplied under more or less high pressure.

In the known apparatuses for thermal spraying, all these supply lines are therefore connected to the spray gun individually using different connectors, with different sealing devices, etc. The consequence is that the different supply lines have to be dismantled and reconnected again in a very time-consuming manner and using various tools when changing the spray guns or when replacing the supply unit which make the different operating media available.

A further problem consists of the known apparatuses for thermal spraying being very inflexible with respect to the types of spray guns and/or supply devices which can be used so that always only one and the same spray gun type can be used without complex conversion work in a given supply unit, since the corresponding connectors with seals, etc. differ according to the spray gun and/or supply unit used so that the connectors of the supply lines do not fit to one another at the interfaces between the supply unit and the spray gun.

This is, for example, particularly problematic when the spray gun has to be replaced frequently, for example for servicing purposes, or if different coatings have to be applied sequentially onto one and the same workpiece using very different spray methods. If, for example, a first coating is to be applied to a workpiece by means of a Triplex burner (Sulzer Metco) and a second coating is to be sprayed onto it using an F6 burner by GTV by means of plasma spraying, either two apparatuses for thermal spraying have to be provided and the workpiece has to be converted for the further coating in the plasma spray apparatus after the coating using the Triplex burner, or the Triplex burner has to be replaced by an F6 plasma spray gun, which is frequently either not possible at all or has to be effected with a huge effort of conversion measures which cannot be justified.

SUMMARY OF THE INVENTION

It is therefore an object of the present invention to provide an apparatus for plasma spraying which allows a change to be made without any great effort between different spray guns and/or supply devices of the same or different type and which ensures a very high degree of flexibility with respect to the types of spray guns and spray methods which can be used.

The invention which satisfies these objects is characterized by the features described below.

The dependent claims refer to particularly advantageous embodiments of the invention.

The invention thus relates to an apparatus for thermal spraying including a spray gun with a burner, with an operating medium being able to be supplied to the spray gun via a feed line, and a base part which is in communication with the supply unit for the operating medium via a supply line. A releasable coupling device is provided, with the feed line including an adapter part such that the adapter part can be connected to the base part by means of the releasable coupling device.

It is important for the invention that a two-part connector is provided in the connection line between the supply unit and the spray gun and includes an adapter part, on the one hand, which is connected to the spray gun via the feed line and, on the other hand, includes a base part that is in communication with the supply device via the supply line, with the adapter part being connectable to the base part by means of the releasable coupling device in accordance with the invention.

The fact that the base part can be connected to the adapter part by means of the releasable coupling device means that the adapter part and the base part are made and are arranged with respect to one another such that they can be connected to one another with the help of the coupling device such that the supply line can be brought into communication with the feed line via the adapter part and the base part such that the operating medium, that is, e.g. operating gases, electrical current, coolant, etc., can be exchanged reliably between the supply line and the feed line without any loss of operating media, electrical short circuits or leaks of any type in the widest sense occurring on the transition between the supply line and the feed line.

The particular advantage of the apparatus in accordance with the invention for thermal spraying consists of the fact that, if any desired base unit is equipped with a supply line and the base part in accordance with the invention and e.g. two spray pistols of different or of the same type have to be replaced with one another, they each simply only have to be equipped with an adapter piece in accordance with the invention at their feed line. The compatibility of the spray apparatus with the two same or different spray guns is thereby automatically ensured since the adapter piece and the base part can be connected by means of the releasable coupling device.

In a particularly preferred embodiment important for practice, the unit of base part with adapter part and releasable coupling device is made as a fast-release adapter, with the releasable coupling device being able to be an eccentric catch, a bayonet connector or a screw connection, e.g. a screw connection with a clamping nut or a screw connection which connects the base part to the adapter part by a bore, with a bore with a thread being able to be provided, for example, in the adapter part and/or in the base part or with the screw connection being able to be realized by a throughgoing screw with a lock nut.

In all these embodiments, a fast and completely problem-free connection or disconnection of the adapter part to or from the base part is ensured because either no tool is required at all, as in the case of an eccentric catch, of a bayonet connection or of a clamping nut, or only one single standardized tool is required for each burner type fitted with an adapter part in accordance with the invention. In addition, all individual parts of the feed line (electrical lead, cooling water, operating gases, feed lines for spray materials, etc.) can be connected or disconnected simultaneously in one single workstep with one single adapter apparatus of adapter part and base part. It is self-explanatory that it can be expedient in special cases to use a plurality of adapter apparatuses of adapter part and base part in parallel in a single apparatus for thermal spraying.

In an embodiment of particular significance for practice, the burner is a plasma burner. It is very frequently the case that the plasma burner, for example, has to be replaced for servicing or that it is necessary to work with different types of plasma burners in one and the same apparatus for thermal spraying.

Basically, any type of spray gun can be used in the apparatus in accordance with the invention for thermal spraying if the spray gun is provided with only one adapter part at the feed line. For example, the spray gun can thus be a spray gun for flame spraying, for high velocity flame spraying, for arc spraying or for flame shock spraying or any other thermal spray gun.

As already mentioned, the feed line between the adapter part and the spray gun and/or the supply line between the base part and the supply device can include an electrical lead to supply the spray gun with electrical energy.

The feed line and/or the supply line can furthermore include a cooling line for the supply of the spray gun with a coolant, a gas supply for the supply of the spray gun with an operating gas, a spray medium supply for the supply of spray powder and/or a spray wire and/or further feed lines and/or supply lines for the supply of the spray gun with further operating media.

In a special embodiment, a sensor for the measurement of an operating parameter and/or a control element for the control and/or regulation of an operating parameter is/are provided at the apparatus for thermal spraying, for example in or at the spray gun or at another suitable position at the apparatus for thermal spraying.

For this purpose, the feed line and/or the supply line can additionally include a sensor line for the sensor and/or a control line for the control element.

It is self-explanatory that the previously named and schematically described embodiments of apparatuses in accordance with the invention for thermal spraying by no means represent an exclusive list and rather stand as representatives for further embodiments. Any meaningful combination of the previously described examples can in particular be advantageously realized and used in practice in special case.

The invention will be explained in more detail in the following with reference to the schematic drawing.

BRIEF DESCRIPTION OF THE DRAWINGS

FIG. 4 shows a longitudinal section in accordance with FIG. 2.

DESCRIPTION OF THE PREFERRED EMBODIMENTS

Figure 1:
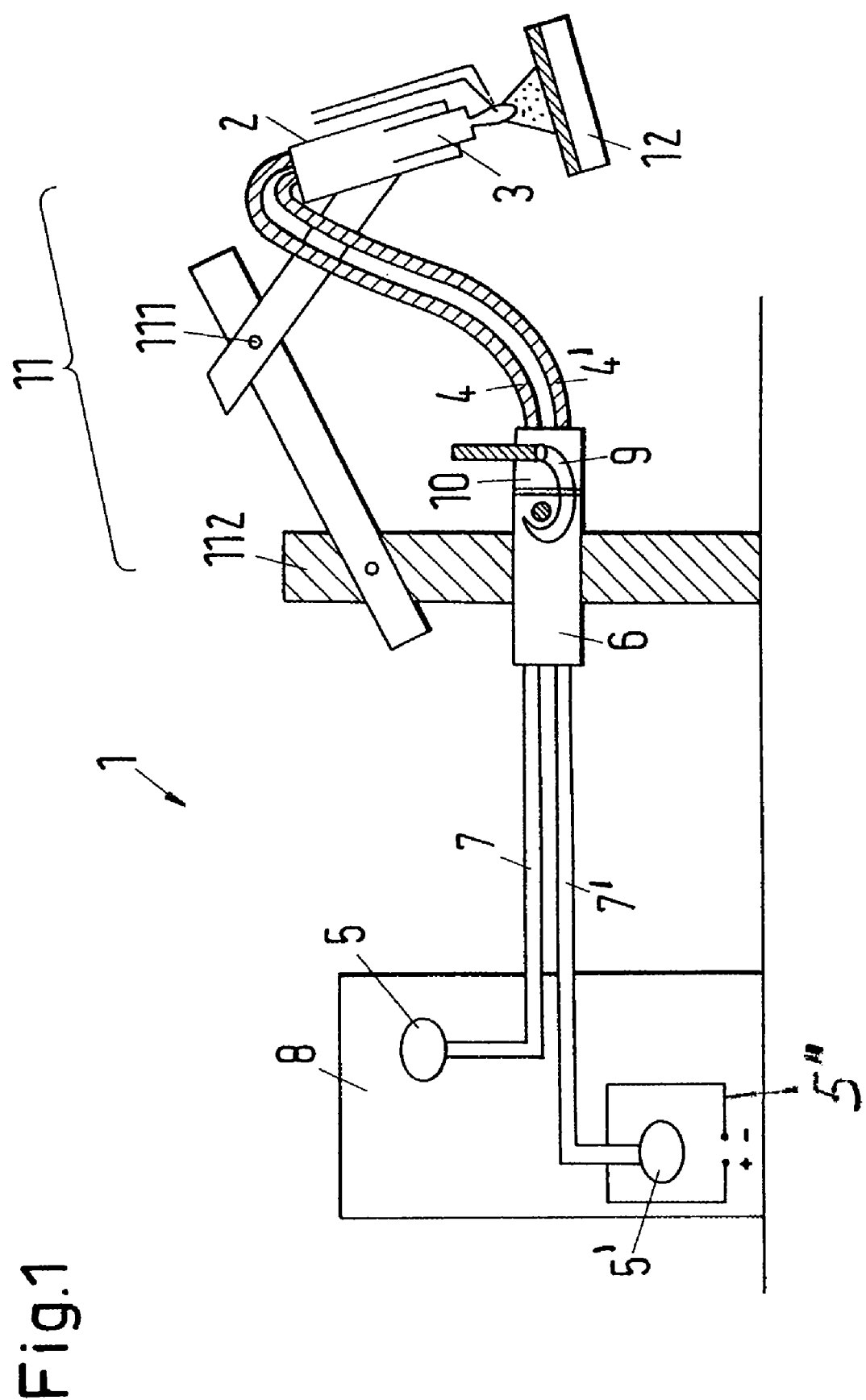
FIG. 1 shows an apparatus in accordance with the invention for thermal spraying.

FIG. 1 shows an apparatus in accordance with the invention for thermal spraying in a schematic representation which is designated overall in the following with reference numeral 1 and which has the substantial components typical for practice.

The apparatus for thermal spraying 1 in accordance with the invention includes a supply unit 8, and a robot unit 11 with robot arms 111 to which a spray gun 2 is attached. The spray gun 2 is freely positionable by movement of the robot arms 111 so that a workpiece 12 can be coated in a manner known per se in accordance with a pre-settable scheme. The robot unit 11 can be connected by signal via a signal line to a control unit not shown here for control and/or regulation. It is also possible for the control unit for the robot unit 11 to be integrated in the supply unit 8 so that the signal line is integrated into supply line 7, 7', which connects the base part 6 to the supply unit 8, and/or into the feed line 4 which connects the adapter part 10 to the spray gun 2.

In the embodiment of FIG. 1, the base part is firmly connected to a frame 112 of the robot unit 11. It is self-explanatory that the base part can also be fastened to a separate support frame, to a wall of a coating booth or to another suitable position. It is moreover clear that the coupling piece of base part 6 and adapter part 10 can also advantageously be used in apparatuses for thermal spraying which do not have a robot guide, but in which the spray gun 2 is attached in a stationary manner. The adapter part 10 is connected to the base part 6 by a releasable coupling device 9, with the coupling device 9 being designed as an eccentric catch 9 in the present example. If the spray gun 2 has to be replaced, the adapter part 10, which is not directly connected to the frame 112 of the robot unit 11, can be disconnected with one movement, without using any tool, by releasing the eccentric catch 9 from the base part 6.

Figure 2:
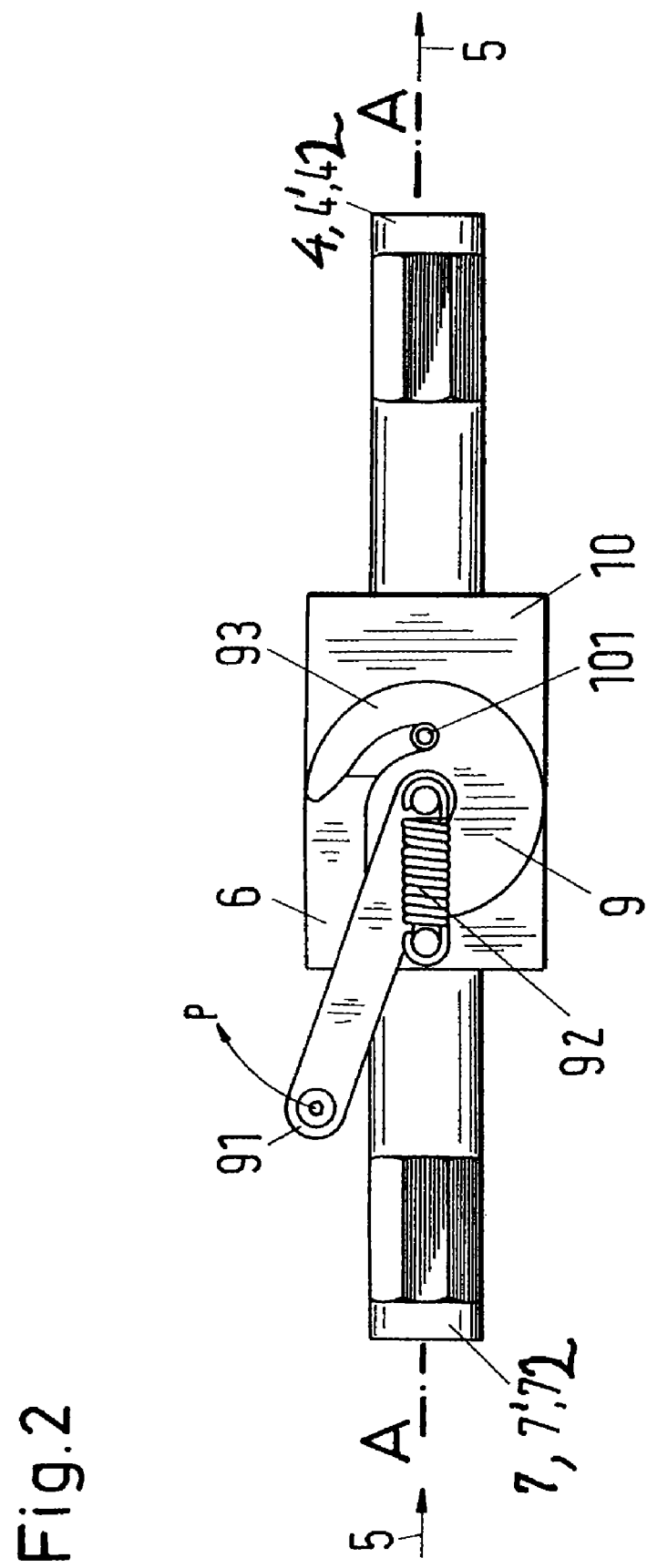
FIG. 2 shows a base part with eccentric lift and adapter part in accordance with FIG. 1.

In FIG. 2, a base part is shown in more detail with an eccentric catch and an adapter part in accordance with FIG. 1. The eccentric catch is arranged rotatably around a securing axis at the base part 9 in a manner known per se. Eccentric catches are known per se, e.g. in the function of a quick coupler, so that it is not necessary to look into their general function here. If the eccentric catch is moved in the direction of the arrow P by means of the handle 91, the bias spring 92 is relaxed which is substantially biased by the clamping of the eccentric disc 93 to the holding pin 101 which is fixed to the adapter part 10 and the eccentric disc 93 releases the holding pin 101 so that the adapter part 10, which is pressed against the base part 6 with substantial force with a tensioned bias spring 92, is released from the base part 6 so that the adapter part 10 can be disconnected from the base part 6 quickly and without any tool by a movement of the handle 91 in the direction of the arrow P.

It is self-explanatory that the embodiment of an eccentric catch 9 shown in FIG. 2 is only schematic and is representative for all possible specific embodiments of a fast disconnection adapter 9. It is moreover possible that the holding pin 101 is provided at the base part 6 and that the eccentric catch 9 with bias spring 92 is provided at the adapter part 10.

Figure 3A:
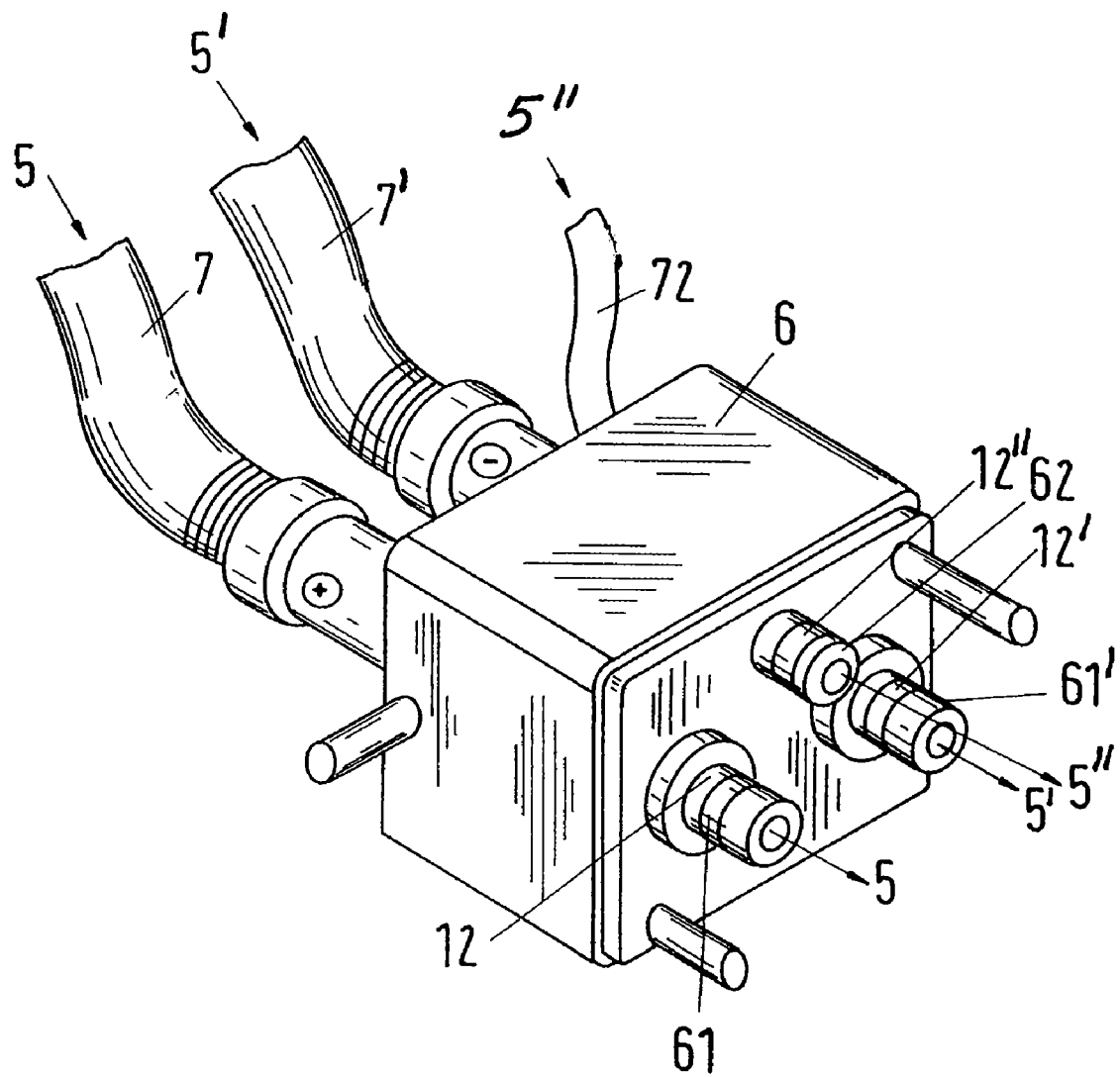
FIG. 3a shows a base part.
Figure 3B:
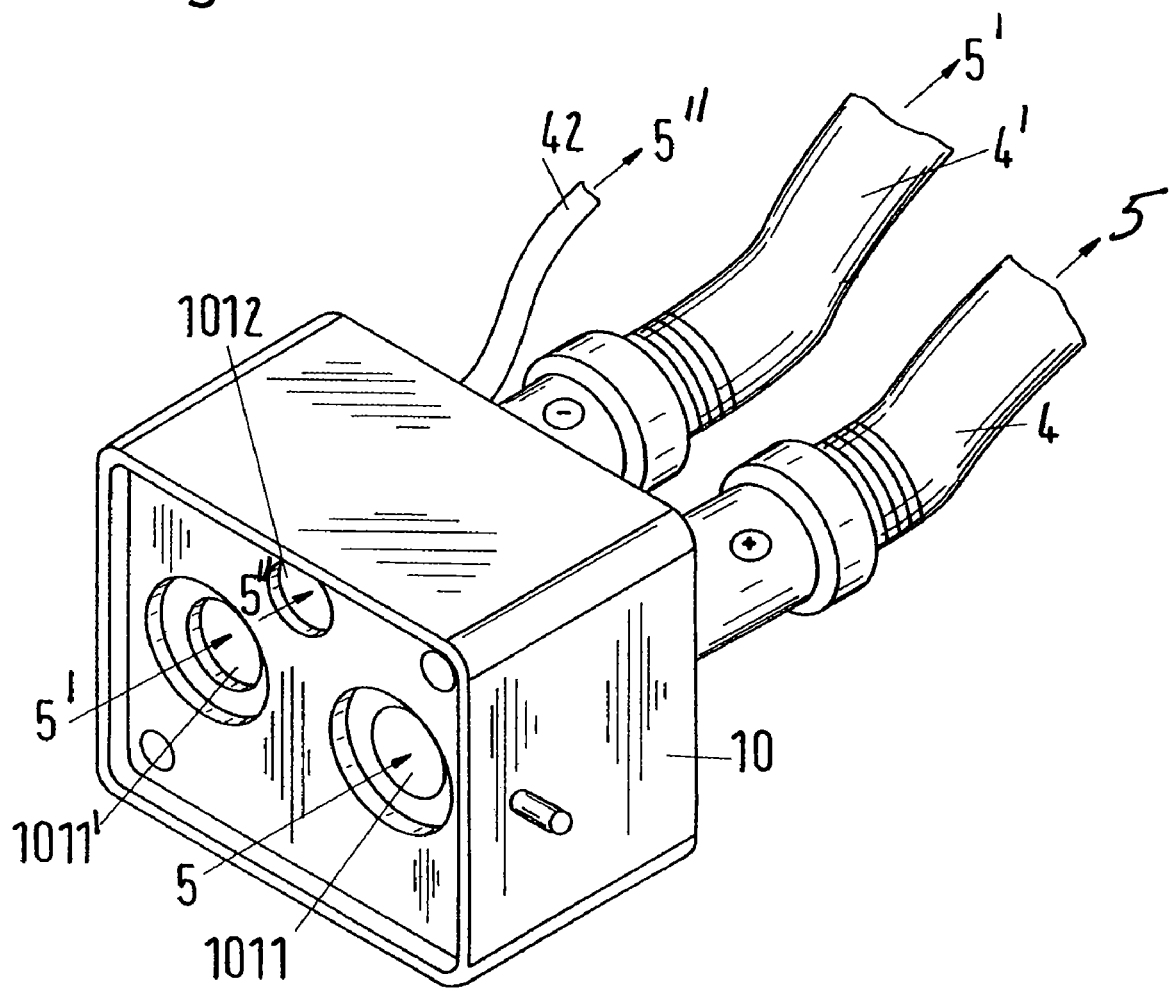
FIG. 3b shows an adapter part.

In FIG. 3a, a special embodiment is shown for a base part 6 and in FIG. 3b an adapter part corresponding thereto, with the representation of the releasable coupling device 9 being omitted for reasons of clarity.

The base part 6 in accordance with FIG. 3a is connected to a supply unit 8 not shown here by three supply lines 7, 7', 72. The three corresponding feed lines 4 of the adapter part 10 of FIG. 3b are correspondingly connected to a spray gun 2 (not shown). The supply lines 7, 7', and correspondingly the feed lines 4, 4', are made in a manner known per se as internally cooled electrical lines through which cooling water 5, 5' flows, for example, in the operating state and which thus supply the spray gun with electrical energy 5, 5', on the one hand, and with cooling water, on the other hand. The supply line 72 and the corresponding feed line 42 are a gas supply so that the spray gun 2, which can be a plasma burner 2, for example, can be supplied with an operating gas 5", for example with an inert gas 5", in the operating state.

The base part 6 has three connection stubs 61, 61', 62—corresponding to the three supply lines 7, 7', 72—and thus each forms a direct extension of the supply lines 7, 7', 72.

The adapter part 10 accordingly has three connection openings 1011, 1011', 1012 which correspond to the connection stubs 61, 62 and which are each in direct communication with the feed lines 4, 4', 42.

To connect the adapter part 10 to the base part 6, the connection openings 1011, 1011', 1012 receive the corresponding connection stubs 61, 61', 62 and the adapter part 10 can then be connected in an actively fixed manner to a releasable coupling device 9 for the sealing connection to the base part 6, for example, as shown in more detail in FIG. 2.

The sealing rings 12, 12', 12" at the connection stubs 61, 61', 62 make a seal to the interior of the connection openings 1011, 1011', 1012 such that the operating media 5, 5', 5" flowing through the connection stubs 61, 61', 62 into the adapter part 10 are not discharged at the interior of the adapter part 10 and are thus forwarded into the feed lines 4, 4', 42 without loss in the operating state.

Finally, a longitudinal section along a longitudinal axis A-A in accordance with FIG. 2 is shown in FIG. 4 which is disposed in coincidence with the longitudinal axis of the supply line 7, 7', or 72 and the feed line 4, 4', or 42. The adapter part 10 is connected to the base part 6 by means of a releasable coupling device 9 in the form of an eccentric catch 9.

The base part 6 is connected to a supply unit 8 (not shown here) with the supply line 7, 7', 72; the corresponding feed line 4, 4', 42 of the adapter part 10 is accordingly connected to a spray gun 2 (not shown). The supply line 7, 7', 72 shown here by way of example and, accordingly, the feed line 41 are made in a manner known per se as internally cooled electrical leads through which cooling water flows, for example, in the operating state and which thus supply the spray gun 2 with electrical energy, on the one hand, and with cooling water, on the other hand.

Corresponding to the three supply lines 7, 7', 71, the base part 6 has supply stubs 61, 61', 62 which are in direct communication with one of the supply lines 7, 7', 72 and thus in each case form a direct extension of the supply line.

Accordingly, the adapter part 10 has connection openings 1011, 1011', 1012 which correspond to the connection stubs 61, 61', 62 and which are in direct communication with the feed lines 4, 4', and 42. To connect the adapter part 10 to the base part 6, the connection openings 1011, 1011', 1012 receive the corresponding connection stubs 61, 61', 62 and the adapter part 10 is connected in an actively fixed manner to the releasable coupling device 9 for the sealing connection to the base part 6.

The sealing rings—here, for example, but not necessarily, two sealing rings 12, 12' at the connection stub 61, 61'—make a seal against the interior of the connection openings 1011, 1011' such that the operating media 5 flowing through the connection stubs 61, 61' into the adapter part 10 are not discharged at the interior of the adapter part 10 and are thus completely forwarded into the feed lines 4, 4' in the operating state.

It is self-explanatory that the sealing rings 12, 12', 12" can also or additionally be provided in a suitably designed recess in the connection openings 1011, 1011', 1012 and that, in dependence on the demand, the sealing connection can also be designed differently, e.g. that the sealing rings 12, 12', 12" do not contact the periphery of the connection stubs 61, 61', 62, but e.g. sealingly contact the end face, or that other suitable sealing measures are provided.

It is moreover self-explanatory that—depending on which operating media 5, 5', 5" have to be supplied via the supply lines 7, 7', 72 or the feed lines 4, 4', or 42, e.g. operating gases, operating liquids or electrical energy—respective, possibly different, suitable sealing measures have to be taken which have to be adapted to the operating medium as such and to the physical and chemical conditions such as, among others, pressure, temperature, chemical properties, abrasive properties, for example when a spray powder has to be transported. In addition, suitable insulation measures against temperature or electrical currents or electrical voltages must possibly also be taken. All correspondingly required sealing and insulating measures are very well known to the person skilled in the art and do not have to be explained in detail any more closely here.

An apparatus for thermal spraying is thus provided for the first time by the invention in which, on the replacement or on the installation of another spray gun, all supply lines do not have to be connected individually to the spray gun using different connectors, with different sealing devices, etc.

This means that all individual parts of the feed line (electrical feed line, cooling water, operating gases, feed lines for spray materials, etc.) can be connected or disconnected simultaneously with one single adapter apparatus including an adapter part, a base part and a releasable coupling device in one single workstep. It is possibly expedient in special cases to use a plurality of adapter apparatuses of adapter part and base part in parallel in a single apparatus for thermal spraying.

The enormously time-consuming mounting or dismantling with different tools is thus omitted.

An at least equally significant advance consists of the fact that the flexibility is substantially improved by the invention with respect to the usable types of spray guns and/or supply devices; i.e. not only one and the same spray gun type can be used without complex conversion work with a given supply unit, since the corresponding connectors with seals, etc. differ in dependence on the spray gun and/or supply unit used so that the connectors of the supply lines at the interfaces between the supply unit and the supply gun do not fit one another, but very different types of spray guns can be replaced with one another comfortably. It is possible without problem to use so-called multi-functional adapters to which the feed lines of different types of spray guns (plasma burners, HVOF burners, wire or powder flame spray guns, etc.) can be connected simultaneously or alternately.

The flexibility and the simplification in the changing of the spray gun can additionally be even further increased in that the spray gun itself is attached to a robot arm or to another suitable holder device such as a separate holder or a wall of a coating booth by a fast coupling, e.g. by a bayonet connector, an eccentric catch or a quick-screw connection, which can be released by hand.

The invention claimed is:

1. An apparatus for thermal spraying including a spray gun with a burner, wherein an operating medium can be supplied to the spray gun via a feed line, and a base part which is in communication with a supply unit for the operating medium via a supply line, wherein a releasable coupling device is provided and the feed line includes an adapter part such that the adapter part can be connected to the base part by means of the releasable coupling device, and wherein the feed line and/or the supply line includes an electrical feed line for the supply of the spray gun with electrical energy, and the feed line and/or the supply line includes a cooling line for the supply of the spray gun with a coolant, said adapter part configured to direct the coolant through said electrical feed line, thus internally cooling said electrical feed line.

2. An apparatus in accordance with claim 1, wherein the releasable coupling device is an eccentric catch, a bayonet connector or a screw connection.

3. An apparatus in accordance with claim 1, wherein the burner is a plasma burner.

4. An apparatus in accordance with claim 1, wherein the spray gun is a spray gun for flame spraying, for high velocity flame spraying, for arc spraying or for flame shock spraying.

5. An apparatus in accordance with claim 1, wherein the feed line and/or the supply line includes a gas supply for the supply of the spray gun with an operating gas.

6. An apparatus in accordance with claim 1, wherein the feed line and/or the supply line includes a spray means supply for the supply of spray powder and/or of a spray wire.

7. An apparatus in accordance with claim 1, wherein a sensor is provided for the measurement of an operating parameter and/or a control element is provided for the control and/or regulation of an operating parameter.

8. An apparatus in accordance with claim 7, wherein the feed line and/or the supply line includes a sensor lead for the sensor and/or a control line for the control element.

9. An apparatus for thermal spraying including a spray gun with a burner, comprising:
   a base part in communication with a supply unit via a supply line, said supply unit comprising an operating medium;
   an adapter part in communication with the spray gun via a feed line; and
   a releasable coupling device to connect the base part to the adapter part in a single step, thus providing communication for the operating medium from the supply unit to the spray gun;
   wherein the feed line and/or the supply line includes an electrical feed line for the supply of the spray gun with electrical energy, and the feed line and/or the supply line includes a cooling line for the supply of the spray gun with a coolant,
   and wherein said adapter part is configured to direct the coolant through said electrical feed line, thus internally cooling said electrical feed line.

\* \* \* \* \*